United States Patent
Gamet et al.

(10) Patent No.: US 10,291,889 B2
(45) Date of Patent: *May 14, 2019

(54) MULTIPLE LIGHT SOURCE PROJECTION SYSTEM TO PROJECT MULTIPLE IMAGES

(71) Applicant: North Inc., Kitchener (CA)

(72) Inventors: Julien Gamet, Saint Pierre d'Allevard (FR); Nicolas Abele, Demoret (CH)

(73) Assignee: North Inc., Kitchener, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/613,634

(22) Filed: Jun. 5, 2017

(65) Prior Publication Data

US 2018/0131910 A1    May 10, 2018

Related U.S. Application Data

(63) Continuation of application No. 13/881,130, filed as application No. PCT/EP2010/068606 on Dec. 1, 2010, now Pat. No. 9,671,683.

(51) Int. Cl.
*G03B 21/26* (2006.01)
*H04N 9/31* (2006.01)
*G03B 21/28* (2006.01)

(52) U.S. Cl.
CPC .......... *H04N 9/3147* (2013.01); *G03B 21/26* (2013.01); *G03B 21/28* (2013.01); *H04N 9/31* (2013.01)

(58) Field of Classification Search
CPC ...... G03B 21/26; G03B 21/28; H04N 9/3147; G02B 27/1006; G02B 27/106; G02B 27/141

See application file for complete search history.

(56) References Cited

U.S. PATENT DOCUMENTS

| | | | | |
|---|---|---|---|---|
| 5,548,348 A * | 8/1996 | Kawabata | ............ | H04N 5/7441 348/756 |
| 6,362,797 B1 * | 3/2002 | Dehmlow | ................ | G09G 5/00 345/32 |
| 6,568,815 B2 * | 5/2003 | Yano | .................... | H04N 9/3111 348/E9.027 |
| 6,886,943 B1 * | 5/2005 | Greenberg | ............. | G03B 21/26 345/1.3 |
| 7,828,444 B2 * | 11/2010 | Lai | ......................... | G03B 21/28 353/101 |
| 7,837,333 B2 * | 11/2010 | Chou | .................... | G02B 27/104 353/119 |
| 8,104,896 B1 * | 1/2012 | Bilak | ........................ | G09G 3/02 345/1.2 |

(Continued)

FOREIGN PATENT DOCUMENTS

WO   WO 2010027132 A1 *  3/2010  .......... G02B 27/104

*Primary Examiner* — Bao-Luan Q Le
(74) *Attorney, Agent, or Firm* — Thomas Mahon

(57) ABSTRACT

A projection apparatus, comprising one or more light sources, wherein the one or more light sources are arranged to collectively provide a light signal which comprises multiple wavelengths, wherein the projection apparatus further comprises an optical filter configured to filter the light signal provided by the one or more light sources, so that two or more images may be projected simultaneously by the projection apparatus, each image being projected to a different position. There is further provided a scanning device which uses the afore-mentioned projection apparatus.

20 Claims, 2 Drawing Sheets

(56) References Cited

U.S. PATENT DOCUMENTS

| | | | | |
|---|---|---|---|---|
| 8,123,361 B2 * | 2/2012 | Nagashima | G06F 3/0423 | 353/30 |
| 8,233,035 B2 * | 7/2012 | Marcus | G02B 27/2264 | 348/53 |
| 8,243,287 B2 * | 8/2012 | Nishigaki | G03B 21/132 | 356/614 |
| 8,251,521 B2 * | 8/2012 | Mizushima | G02B 6/06 | 353/11 |
| 8,277,055 B2 * | 10/2012 | Kuhlman | B60K 35/00 | 353/11 |
| 8,482,549 B2 * | 7/2013 | Liu | G02B 27/26 | 345/175 |
| 8,633,892 B2 * | 1/2014 | Kang | G02B 27/104 | 345/158 |
| 8,749,624 B2 * | 6/2014 | Marcus | G02B 27/2264 | 348/54 |
| 8,950,870 B2 * | 2/2015 | Kang | G02B 27/104 | 345/168 |
| 2001/0021004 A1 * | 9/2001 | Yano | H04N 9/3111 | 353/31 |
| 2005/0088629 A1 * | 4/2005 | Greenberg | G03B 21/26 | 353/94 |
| 2007/0008503 A1 * | 1/2007 | Choi | G03B 21/28 | 353/98 |
| 2008/0074625 A1 * | 3/2008 | Lai | G03B 21/28 | 353/82 |
| 2008/0174740 A1 * | 7/2008 | Chou | G02B 27/104 | 353/31 |
| 2009/0128716 A1 * | 5/2009 | Nagashima | G06F 3/0423 | 348/756 |
| 2010/0177171 A1 * | 7/2010 | Marcus | G02B 27/2264 | 348/53 |
| 2010/0220293 A1 * | 9/2010 | Mizushima | G02B 6/06 | 353/20 |
| 2010/0225887 A1 * | 9/2010 | Sato | G03B 21/005 | 353/31 |
| 2010/0253860 A1 * | 10/2010 | Nishigaki | G03B 21/132 | 348/744 |
| 2010/0302511 A1 * | 12/2010 | Kang | G02B 27/104 | 353/31 |
| 2012/0019781 A1 * | 1/2012 | Kuhlman | B60K 35/00 | 353/13 |
| 2012/0050154 A1 * | 3/2012 | Jagmag | G06F 3/011 | 345/156 |
| 2012/0224036 A1 * | 9/2012 | Marcus | G02B 27/2264 | 348/54 |
| 2012/0256879 A1 * | 10/2012 | Liu | G02B 27/26 | 345/175 |
| 2014/0146292 A1 * | 5/2014 | Kang | G02B 27/104 | 353/31 |

\* cited by examiner

MULTIPLE LIGHT SOURCE PROJECTION SYSTEM TO PROJECT MULTIPLE IMAGES

CROSS-REFERENCE TO RELATED APPLICATIONS

This application is a continuation claiming the benefit of and priority to U.S. patent application Ser. No. 13/881,130 entitled "MULTIPLE LIGHT SOURCE PROJECTION SYSTEM TO PROJECT MULTIPLE IMAGES," filed Apr. 23, 2013 which is a National Stage Entry of International Patent Application No. PCT/EP2010/068606 filed Dec. 1, 2010 which are hereby incorporated by reference in their entireties.

FIELD OF THE INVENTION

The present invention relates to a projection system, in particular a single projection system which is configured to projection two or more images simultaneously.

BACKGROUND TO THE INVENTION

Projection systems in use today are often used to project the images displayed on a computer screen, onto a larger display screen. The ability of projection systems to project images displayed on a computer screen onto a larger display screen has proven particularly useful when presenting to an audience, as it allows each audience member to better view an image on the computer screen.

It is known to use projection systems in place of computer screens. These projection systems usually connect directly to a computer hard drive and project a Graphical User Interface onto a display screen (as opposed to the Graphical User Interface being displayed on a computer screen).

Projections systems which project virtual devices are also known. For example projections systems which project the image of a keyboard are known. Such projection systems may further comprise a detector which is operable to detect the position fingers within a frame of the projected image of the keyboard. The detector can detect at which key the user has positioned a finger thereby providing a virtual keyboard.

By using a projection system which projects a virtual keyboard along with a projection system which can project the Graphical User Interface of a computer onto a display screen, a virtual computer is provided. However, to achieve a virtual computer, two distinct projection systems are required, a first projection system to project a virtual keyboard onto a display surface and a second projection system is required to project the Graphical User Interface onto a display screen. The hardware required to achieve a virtual computer is thus expensive and is far too large for integration in mobile devices.

To reduce the cost of the hardware required for the projection of a virtual computer, it is known to use a single projector to project two images successively; the projector projects a first image e.g. a virtual keyboard onto a first display screen, after the projection system has completed projection of the virtual keyboard, it subsequently projects a second image e.g. the Graphical User Interface of a computer, onto a second display screen. The speed at which the first and second images are projected is such that both images are simultaneously visible to a user. To project the first and second images onto the first and second display screens respectively, the projection system comprises a single reflective surface which oscillates about oscillation axes to scan light across the display screens.

In the case of the projection with a single or dual MEMS scanning system, the light comprises pulses, each pulse of light corresponding to a pixel of an image. The reflective surface is oscillated about a first oscillation axis to scan light in a zig-zag or lissajou pattern across the first display screen to display the first image pixel-by-pixel, the reflective surface is then displaced and oscillated about a second oscillation axis to scan light in a zig-zag or lissajou pattern across the second display screen to display the second image pixel-by-pixel. In the case of the projection with a DLP (Digital Light Processing), LCOS (Liquid Crystal On Silicon) or LCD (Liquid Crystal Display) type-based projection systems, the light from the first image is deflected by an oscillating reflective surface then followed by the redirection of the light of the second projected image.

It is required that each of the first and second images be refreshed at a minimum threshold frequency so that complete images it will be visible on each of the first and second display screens; so once the reflective surface has oscillated to scan light across the second display screen to display the second image, the reflective surface returns to scan light across the first display screen to display the first image once more; this process is continuously repeated and is done at a speed which ensures that the first and second images appear to a viewer to be simultaneously projected onto their respective display screens. The reflective surface is required to oscillate at a minimum speed to ensure that both the first and second images are refreshed at the minimum threshold frequency (normally at a frequency which is greater than the human eye persistence); so that, to a viewer, complete first and second images are simultaneously visible on the first and second display screens respectively.

As the two images are projected in succession, it is necessary for the reflective surface to oscillate twice as fast, compared to a reflective surface in a projector which projects a single image, so that both of the projected images are refreshed at the minimum threshold frequency. If the first and second images are not refreshed at the minimum threshold frequency (or a frequency which is greater than the minimum threshold frequency) the image qualities of the first and second images would be compromised, and complete first and second images would not be simultaneously visible to a viewer on the respective display screens. The high speed of oscillation of the reflective surface, required to ensure that both of the projected images are refreshed at the minimum threshold frequency (or greater), is difficult to attain and demands high power consumption.

It is an aim of the present invention to obviate or mitigate one or more of the aforementioned disadvantages.

SUMMARY OF THE INVENTION

According to a first aspect of the present invention there is provided a projection apparatus, comprising one or more light sources, wherein the one or more light sources are arranged to collectively provide a light signal which comprises multiple wavelengths, wherein the projection apparatus further comprises an optical filter configured to filter the light signal provided by the one or more light sources, so that two or more images can be projected simultaneously by the projection apparatus, each image being projectable to a different position.

The provision of an optical filter enables components of the light signal to be separated. Therefore, a light signal which simultaneously comprises two or more light components each of which defines pixels for two or more images, can be used by the projection apparatus. A light signal which simultaneously comprises two or more light components each of which defines pixels for two or more images, is projected and scanned using an oscillating mirror. As the projected light is filtered using the filter to separate the two or more light components and each of the two or more separated light components are used to display an image on a display screen. As the oscillating mirror oscillates it scans the light signal which in turn effects scanning of the two or more light components simultaneously, so that the one or more images are refreshed simultaneously. Therefore, the oscillating mirror is not required to oscillate at the high frequency required when projecting the two or more images in succession.

The one or more light sources may be arranged to collectively provide a single light signal which comprises multiple wavelengths.

The light signal may comprise one or more light components wherein each of the two or more light components define one or more pixels of an image. Each of the two or more light components may define pixels of independent images; for example, the light signal may comprise two or more light components which define one or more pixels of two or more independent images. Each of the two or more light components may define pixels of different images; for example, the light signal may comprise two or more light components which define one or more pixels of two or more different images. The different images may be independent. Each of the one or more light components may be defined by one or more wavelengths or a range of wavelengths. Each of the two or more light components may comprise different wavelengths or different ranges of wavelengths (For example, the light signal may comprise a first light component which has a wavelength of between 400-500 nm and a second light component which as a wavelength of between 501 nm-1000 nm). A light component which is usable to define one or more pixels of a first image may comprise a different wavelength, or different range of wavelengths of light, to the wavelength or range of wavelength of another light component which is usable to define one or more pixels of another image. For example, the light signal may comprise, a first light component which has a first wavelength, wherein the first light component defines one or more pixels of a first image, and a second light component light which has a second wavelength, wherein the second light component defines one or more pixels of a second image. The light signal may comprise, a first light component which has a first range of wavelengths, wherein the first light component defines one or more pixels of a first image, and a second light component light which has a second range of wavelengths, wherein the second light component defines one or more pixels of a second image.

The optical filter may be configured to filter light which has a wavelength or a wavelength range which corresponds to a wavelength or wavelength range which defines a light component of the light signal.

A component of the light signal which passes through optical filter is configured such that it is usable to project a first image onto a display screen. A component of the light signal which passes is used to project a first image onto a display screen.

A component of the light signal which is filtered out of the light signal by the optical filter is configured such that it is usable to project a second image onto a display screen. A component of the light signal which is filtered out of the light signal by the optical filter is used to project a second image onto a display screen.

The two or more images may comprise one or more virtual devices. For example a first image may comprise a virtual keyboard; a second image may comprise a Graphical User Interface of a computer or a virtual display screen.

The projection apparatus may further comprise a sensor. The projection apparatus may further comprise a sensor. The sensor may be operable to sense touch or position. The sensor may be operable to sense touching of the at least one of the two or more images. The sensor may be further operable to sense the position on the at least one image where the at least one image has been touched. The sensor may be a tactile sensor which is operable to sense touch or a position sensor which is operable to sense position The sensor may be a tactile sensor which is operable to sense touch or a position sensor which is operable to sense position. The sensor may be operable to detect the position or touch, of a user fingers on a virtual keyboard. For example, in the first image projected by the projection apparatus may be a virtual keyboard, the sensor may be operable detect when a user touches a key of the virtual keyboard. The sensor may also be operable to display on the display screen characters which correspond to the key which the user touches. For example the second image by the projection device may be a virtual computer screen, and the sensor may be operable to detect when a user touches a key of the virtual keyboard and to display on the virtual computer screen characters which correspond to the key which the user touched.

The filter may be configured to filter light has a predefined wavelength or a predefined range of wavelengths, from the light signal which. For example, the optical filter may be configured to filter light which has a wavelength within an LCD range, from light signal. The optical filter may be configured to filter light which has a wavelength within an ultra high lamp range, from the light signal. The optical filter may be configured to filter light which has a wavelength within an LED range, from the light signal.

The filter may further comprise a film which is configured to filter the light projected by the projector.

The optical filter may be a dynamic optical filter. The dynamic optical filter may be adjustable by a user to filter light which has as a desired wavelength, or to filter light which has a wavelength within a desired wavelength range, from the light signal.

The optical filter may be configured deflect light which has one or more selected wavelengths of the light towards a display position. The one or more selected wavelengths may correspond to a wavelength or wavelength range of a component of the light signal. The optical filter may be configured deflect light within a selected wavelength range towards a display position. The optical filter may be configured deflect light which has one or more selected wavelengths of the light towards a first display position, and to transmit light which has one or more other selected wavelengths towards a second display position. The optical filter may be configured deflect light which has one or more selected wavelengths of the light towards a first display position, and to deflect light which has one or more other selected wavelengths towards a second display position. The optical filter may be configured deflect light which has selected wavelengths of the light towards a first display position, and to deflect light which has one or more other selected wavelengths of light towards a second display position. This will enable the optical filter to deflect one or more light components of the light signal, each of the one or more light components comprising different wavelengths or different ranges of wavelengths, to different positions. Preferably, the optical filter may be configured to deflect light which has one or more selected wavelengths of the light, towards a first display screen, and to deflect light which has one or more other selected wavelengths of the light signal, towards a second display screen.

The projection apparatus may comprise a single light source.

The projection apparatus may comprise one or more reflective surfaces which oscillate to scan light across a display screen. The one or more reflective surfaces may comprise one or more MEMS micro mirrors.

The projection apparatus may comprise a plurality of optical filters. The plurality of optical filters may be configured to filter the light signal provided by the one or more light sources. Preferably the plurality of optical filters may be configured so that each optical filter filters light components of different wavelengths or of different ranges of wavelengths from the light signal.

According to a further aspect of the present invention there is provided a method of projecting an image onto one or more display surfaces comprising the steps of
providing a light signal which comprises multiple wavelengths,
filtering one or more light components from the light signal using an optical filter;
displaying a first image on a display surface using a light component which passes through the optical filter;
displaying a second image on a display surface using a light component which was filtered from the light signal using the optical filter.

The method may comprise displaying a first image on a first display surface using a light component which passes through the optical filter and displaying a second image on a second display surface using a light component which was filtered from the light signal using the optical filter.

The optical filter may comprise a lens. The lens may comprise an optical coating.

According to a further aspect of the present invention there is provided a scanning device, comprising,
a means for scanning a product identification code;
a projection apparatus according to any of the aforementioned projection apparatuses.

The two or more images projected by the projection apparatus of the scanning device may comprise one or more virtual devices A first image projected by the projection apparatus of the scanning device may comprise an image of a product corresponding to the product identification code.

A second image projected by the projection apparatus of the scanning device may comprise product information. The product information may be, for example, transit information, delivery date, dispatch date. The product identification code may be a bar code.

The scanning device may be configured so that it can communicate with a database. For example, the scanning device may be configured such that it can communicate with a product database.

BRIEF DESCRIPTION OF THE DRAWINGS

An embodiment of the invention will now be described by way of example only, with reference to the accompanying drawings in which,
FIG. 1 provides a perspective view of a projection apparatus according to the present invention.

DETAILED DESCRIPTION OF THE DRAWINGS

Figure 1:
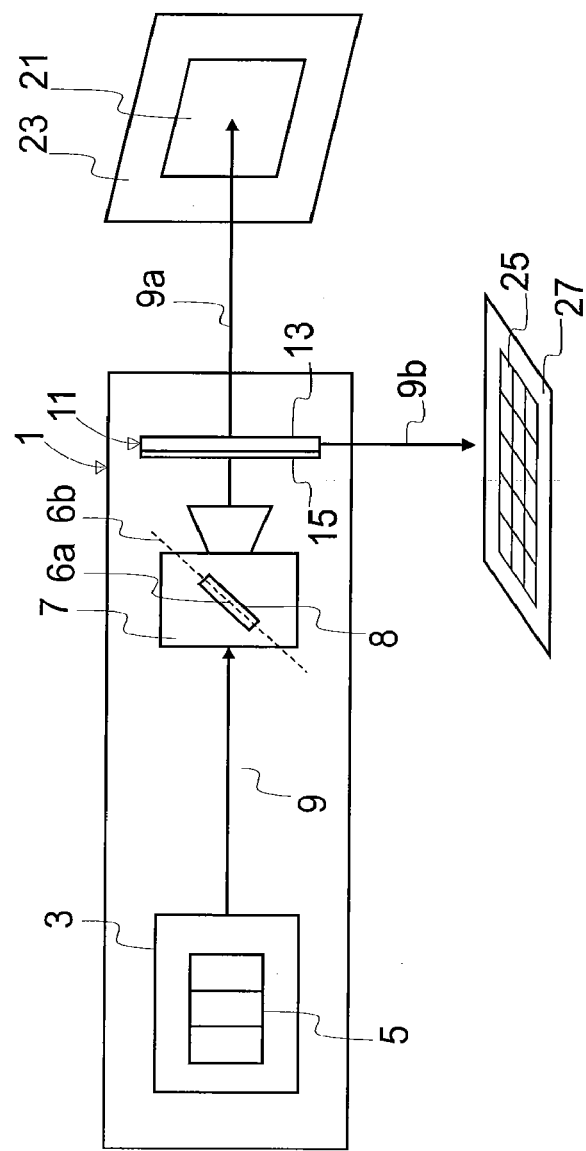

FIG. 1 provides a perspective view of a projection apparatus 1 according to the present invention. The projection apparatus 1 simultaneously projects a first image 21 onto a first display surface 23 and a second image 25 onto a second display surface 27. In this particular example, the second image 25 is a virtual keyboard and the first image 21 is a virtual computer screen which displays the characters typed using the virtual keyboard. However, it will be understood that the first 21 and second 25 images may take any form.

The projection apparatus 1 comprises a single light source 3 which comprises a beam combiner 5. The single light source 3 is arranged to provide a light signal 9 which comprises multiple wavelengths. It will be understood that the projection apparatus 1 is not limited to having a single light source 3 and may alternatively comprise multiple light sources.

The projection apparatus 1 further comprises a projection means 7. The projection means 7 comprises a MEMS micro-mirror 8 which can oscillate about two orthogonal oscillation axes 6a and 6b. It should be understood that, instead of having a single MEMS micro-mirror 8 which can oscillate about two orthogonal oscillation axes, the projection means 7 could alternatively comprise two individual MEMS micro-mirrors each configured to oscillate about an oscillation axis and wherein the oscillation axis of each individual MEMS micro-mirror are orthogonal. One of the MEMS mirrors can oscillate to scan light along the horizontal and the other can oscillate to scan light along the vertical.

The projection means 7 is positioned in an optical path of the light signal 9 transmitted by the single light source 3. The projection means 7 is configured to project the light signal 9 out of the projection apparatus 1 and the micro-mirror 8 will oscillate about the oscillation axes 6a and 6b so as to scan the projected light along the horizontal and vertical directions (i.e. in a zig-zag or lissajou pattern). The projection means 7 may take any suitable form, for example the projector may be MEMS (Micro Electro-Mechanical System), LCD (Liquid Crystal Display), DLP (Digital Light Processing) using DMD (Digital Micromirror Device) or LCOS (Liquid Crystal On Silicon) projector means. For example, the projector mean may comprise a micro-mirror 8 or, the projector mean may comprise a DLP, LCD, LCOS Before leaving the projection apparatus 1, the light signal 9 projected by the projection means 7 first passes through an optical filter 11. The optical filter 11 may take any suitable form, for example the optical filter 11 may be dynamic optical filter adjustable by a user to filter light at any selected wavelength or any selected range of wavelengths. When using a DLP, LCD or LCOS type projection means 7, the optical filter 11 should preferably comprise an optical lens 13 which comprises an optical filter film 15. In the particular embodiment illustrated in FIG. 1 (which uses a MEMS mirror type projection means 7) an optical lens 13 which comprises an optical filter film 15 is not absolutely necessary but nevertheless may be used in this particular example. The optical filter film 15 is configured to filter a component of the light signal 9 which has a wavelength outside of the LCD wavelength range for example. However, it will be understood that the optical filter film 15 could be configured to filter light at a single wavelength, or within another wavelength range such as LED wavelength range, or Ultrahigh Lamp wavelength range.

The optical filter 11 filters the light signal 9 projected by the projection means 7. A first light component 9a, which comprises wavelengths inside the LCD wavelength range for example, passes through the optical filter 11 and is directed to a first display surface 23. A second light component 9b, which comprises wavelengths outside of the LCD wavelength range, is filtered out of the light signal 9 by the optical filter 11 and is deflected to a second display surface 27. In the particular example shown in FIG. 1, the first light component 9a comprises light pulses, wherein each pulse corresponds to a pixel of the first image 21; the second light component 9b comprises light pulses, wherein each pulse corresponds to a pixel of the second image 25.

As the MEMS micro-mirror 8 oscillates about the oscillation axes 6a and 6b, the first light component 9a and the second light component 9b are simultaneously scanned in a zig-zag or lissajou pattern across the first and second display surfaces 23, 27 respectively. When scanned across the first display surface 23 the first light component 9a displays a first image 21 pixel-by-pixel, in the form of a virtual computer screen; when scanned across the second display surface 27 the second light component 9b displays a second image 25 pixel-by-pixel, in the form of a virtual keyboard. The projection apparatus 1 may further comprise a sensor which is operable to detect the position of a user fingers on the virtual keyboard. The sensor may in turn may be operable to display on the virtual computer screen characters corresponding to the particular keys of the virtual keyboard over which the users fingers are positioned.

The provision of the filter enables the projection apparatus to use a light signal 9 which comprises a first and second light component 9a, 9b to simultaneously project first and second images 21, 25 on a first and second display surfaces 23, 27. As the first light component 9a and second light component 9b are contained in the same light signal 9, the first 9a and second 9b light components can be projected simultaneously by the projection means 7. Furthermore, as the MEMS micro mirror 8 oscillates about oscillation axes 6a and 6b, the light signal 9 is scanned along the horizontal and vertical directions, accordingly each of the first 9a and second 9b light components are in turn simultaneously scanned across their respective display surface 23, 27 so that each of the first 21 and second 25 images are simultaneously refreshed. As the first 21 and second 25 images are simultaneously refreshed, this obviates the need for the micro mirror 8 to oscillate at the high frequency which would be required if projecting the two or more images in succession.

Figure 2:
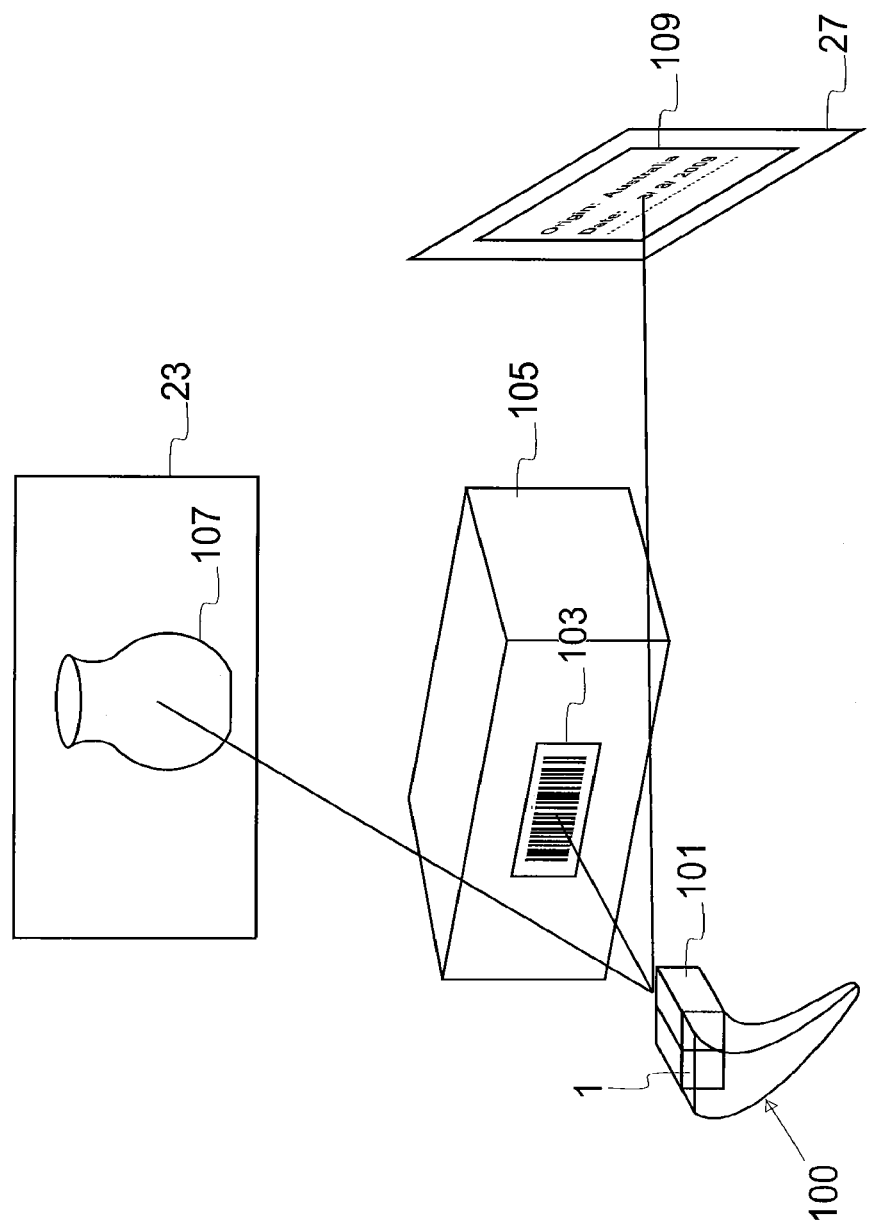
FIG. 2 provides a perspective view of a scanning device according to the present invention.

FIG. 2 provides a perspective view of a scanning device 100 according to the present invention. The scanning device 100 comprises a reader 101 for reading a bar code 103 on packaging 105 of a product.

The scanning device 100 further comprises the projection apparatus 1. The projection apparatus 1 has all the features illustrated in FIG. 1; however, the first image 107 projected by the projection apparatus 1 onto a first display surface 23 is an image of the product contained within the packaging 105. The second image 109 projected by the projection apparatus 1 onto a second display surface 27 is an image depicting shipping information for the product e.g. the origin of the product; the date of shipping; date of arrival at destination etc. In the present embodiment, the first display surface 23 and the second display surface 27 are each surfaces of a wall.

In use the reader 101 of the scanning device 101 reads the bar code 103 on the packaging 105 to identify the product inside the packaging 105. The reader subsequently obtains an image of the identified product and product information, from a remote database with which the scanning device 100 is in operable communication with (wireless communication or wired communication). Using the projection apparatus 1 the scanning device 100 projects a first image 107 which depicts the identified product onto the first display surface 23 and projects a second image 27 which depicts shipping information for the product e.g. the origin of the product; the date of shipping; date of arrival at destination etc. onto a second display surface 27. Thus, an image of the product contained within the packaging 105 as well as an image depicting product information is simultaneously visible to a user.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A projection apparatus, comprising:
one or more light sources, the one or more light sources to collectively provide a light signal comprising multiple light beams where at least one of the multiple light beams has a different wavelength than another one of the multiple light beams;
a projector to receive the light signal and project the light signal out of the projection apparatus; and
an optical filter disposed between the projector and a first display surface and a second display surface, the optical filter to receive the light signal and to filter the light signal to direct ones of the multiple light beams of the light signal outside a selected wavelength range to the first display surface to project a first image and to direct other ones of the multiple light beams of the light signal within the selected wavelength range to the second display surface to project a second image.

2. A projection apparatus according to claim 1 the ones of the multiple light beams outside the selected wavelength range to define one or more pixels of the first image and the ones of the multiple light beams within the selected wavelength range to define one or more pixels of the second image, where the one or more pixels of the first image are independent of the one or more pixels of the second image.

3. A projection apparatus according to claim 1, wherein the optical filter is configured to filter light which has a wavelength or wavelength range corresponding to the selected wavelength range.

4. A projection apparatus according to claim 1, wherein the optical filter is configured to deflect light which has a wavelength or wavelength range corresponding to the selected wavelength range.

5. A projection apparatus according to claim 1, wherein the optical filter is a dynamic optical filter.

6. A projection apparatus according to claim 1, wherein the projection apparatus comprises a single light source.

7. A projection apparatus according to claim 1, wherein at least one of the first image or the second image comprises a virtual device.

8. A projection apparatus according to claim 1, comprising a sensor operable to sense touching of the at least one of the first image or the second image.

9. A projection apparatus according to claim 1, the projector comprising a micro-electro-mechanical system projector, a liquid crystal display projector, a digital light processing projector, a liquid crystal on silicon projector, or a digital micromirror device projector.

10. A method of projecting an image onto multiple display surfaces, comprising:
providing a light signal which comprises multiple light beams where at least one of the multiple light beams has a different wavelength than another one of the multiple light beams;
projecting, via a projector, the light beam;
filtering, at an optical filter disposed between the projector and a first display surface and a second display surface, one or more light components from the light signal having a wavelength outside a selected wavelength range;
displaying a first image on the first display surface using a light component which passes through the optical filter;
displaying a second image on the second display surface using a light component filtered from the light signal using the optical filter.

11. The method of claim 10, comprising scanning an indicator, the indicator comprising at least a first indication, the first image comprising information based in part on the first indication.

12. The method of claim 11, the indicator comprising at least a second indication, the second image comprising information based in part on the second indication.

13. A scanning device, comprising:
a scanner to capture an indicator, the indicator comprising at least a first indication; and
a projector, comprising:
one or more light sources, the one or more light sources to collectively provide a light signal comprising multiple light beams where at least one of the multiple light beams has a different wavelength than another one of the multiple light beams;
a projector to receive the light signal and project the light signal out of the scanning device; and
an optical filter disposed between the projector and a first display surface and a second display surface, the optical filter to receive the light signal and to filter the light signal to direct ones of the multiple light beams of the light signal outside a selected wavelength range to the first display surface to project a first image and to direct other ones of the multiple light beams of the light signal within the selected wavelength range to the second display surface to project a second image, the first image based at least in part on the first indication.

14. The scanning device of claim 13, the indicator comprising a bar code.

15. The scanning device of claim 13, the first indication comprising at least one of a shipping address, a shipping destination, a shipping origination, a sender, a shipment date, or a date of arrival, the first image depicting information based on the first indication.

16. The scanning device of claim 15, the indicator comprising a second indication, the second image based at least in part on the second indication.

17. The scanning device of claim 16, the second indication comprising package contents, the second image depicting the package contents.

18. The scanning device of claim 13, the ones of the multiple light beams outside the selected wavelength range to define one or more pixels of the first image and the ones of the multiple light beams within the selected wavelength range to define one or more pixels of the second image, where the one or more pixels of the first image are independent of the one or more pixels of the second image.

19. The scanning device of claim 18, wherein the optical filter is configured to filter light which has a wavelength or wavelength range corresponding to the selected wavelength range.

20. The scanning device of claim 13, wherein the optical filter is configured to deflect light which has a wavelength or wavelength range corresponding to the selected wavelength range.

* * * * *